United States Patent
Masberg et al.

[19]

[11] Patent Number: 6,148,784
[45] Date of Patent: Nov. 21, 2000

[54] DRIVE SYSTEMS, ESPECIALLY FOR A MOTOR VEHICLE, AND METHOD OF OPERATING SAME

[75] Inventors: Ullrich Masberg, Rösrath; Thomas Pels, Achern; Klaus-Peter Zeyen, Köln; Andreas Gründl, München; Bernhard Hoffmann, Starnberg, all of Germany

[73] Assignees: ISAD Electronic Systems GmbH & Co. KG, Cologne; Grundl und Hoffman GmbH, Starnberg, both of Germany

[21] Appl. No.: 09/032,653

[22] Filed: Feb. 27, 1998

Related U.S. Application Data

[63] Continuation of application No. PCT/DE96/01617, Aug. 31, 1996.

[30]   Foreign Application Priority Data

Aug. 31, 1995  [DE]   Germany .......................... 195 32 128

[51] Int. Cl.$^7$ .................................................. F02B 75/06
[52] U.S. Cl. ......................................................... 123/192.1
[58] Field of Search ............................ 123/192.1, 192.2; 60/698, 713, 716, 718, 719; 180/65.2, 65.4

[56]   References Cited

U.S. PATENT DOCUMENTS

| | | | |
|---|---|---|---|
| 2,654,849 | 10/1953 | Trofimov | 310/99 |
| 2,790,917 | 4/1957 | Trofimov | 310/102 |
| 3,774,303 | 11/1973 | Burkett et al. | 30/382 |
| 3,870,116 | 3/1975 | Seliber | 180/54 R |
| 3,902,073 | 8/1975 | Lafuze | 290/46 |

(List continued on next page.)

FOREIGN PATENT DOCUMENTS

| | | |
|---|---|---|
| 58401-73 | 1/1975 | Australia . |
| 0 151 935 A1 | 8/1985 | European Pat. Off. . |
| 0 175 952 A2 | 4/1986 | European Pat. Off. . |
| 0 233 738 A1 | 8/1987 | European Pat. Off. . |
| 0 338 485 A2 | 10/1989 | European Pat. Off. . |
| 0 354 790 A2 | 2/1990 | European Pat. Off. . |
| 0 385 311 A2 | 9/1990 | European Pat. Off. . |
| 0 427 568 A1 | 5/1991 | European Pat. Off. . |
| 0 437 266 A2 | 7/1991 | European Pat. Off. . |
| 0 440 088 A1 | 8/1991 | European Pat. Off. . |

(List continued on next page.)

OTHER PUBLICATIONS

"Kraftfahrzeugtechnik" Nov. 1982, pp. 346–347.

Litton prospect "Bürstenloser Hohlwellen–Resolver SSBH–15", Unterföhring Mar. 1994.

J. Reinert et al., "Digital control and Optimization of a Rolling Rotor Switched Reluctance Maching", IEEE Transactions on Industry Appliations, vol. 31, No. 2, Mar./Apr. 1995, pp. 338–344.

F. Simovert, "Spannungszwischenkreis–Umrichter Baureihe 6SC44. . . der Fa. Siemens AG", 1985, No. 1 19100–E319–A262.

(List continued on next page.)

*Primary Examiner*—Noah P. Kamen
*Attorney, Agent, or Firm*—Blakely, Sokoloff, Taylor & Zafman LLP

[57]   ABSTRACT

The invention concerns a drive system, especially for a motor vehicle, with a drive assembly, especially an internal combustion engine (1), and at least one electric machine (4) for active reduction of rotational nonuniformities, acting on the drive assembly, in particular, its drive shaft (10) or a shaft coupled or which can be coupled to it, wherein at least one sensor (16, 32) of the drive system and/or at least one quantity derived from sensor information serves both to control the drive assembly and also to control the electric machine (4), and/or wherein a control unit (31 and 33, respectively) responsible for the control of the electric machine (4) or of the drive assembly also partly or entirely controls the drive assembly or the electric machine (4), respectfully. The invention is also oriented to a method of operating such a drive system.

13 Claims, 5 Drawing Sheets

U.S. PATENT DOCUMENTS

| | | | |
|---|---|---|---|
| 3,974,396 | 8/1976 | Schönball | 290/54 |
| 4,025,860 | 5/1977 | Shibata et al. | 320/3 |
| 4,066,936 | 1/1978 | Hirota | 318/139 |
| 4,346,773 | 8/1982 | Hofbauer et al. | 180/165 |
| 4,407,132 | 10/1983 | Kawakatsu et al. | 60/716 |
| 4,470,476 | 9/1984 | Hunt | 180/65.2 |
| 4,699,097 | 10/1987 | Tanaka et al. | 123/192 |
| 4,797,602 | 1/1989 | West | 322/10 |
| 4,803,376 | 2/1989 | N'Guyen | 290/22 |
| 4,825,139 | 4/1989 | Hamelin et al. | 322/90 |
| 4,883,973 | 11/1989 | Lakey et al. | 290/31 |
| 4,942,950 | 7/1990 | Watanabe et al. | 192/0.096 |
| 4,951,769 | 8/1990 | Kawamura | 180/65.4 |
| 4,958,095 | 9/1990 | Uchida et al. | 310/59 |
| 5,020,491 | 6/1991 | Mashino | 123/192 |
| 5,053,632 | 10/1991 | Suzuki et al. | 290/45 |
| 5,109,815 | 5/1992 | Maeda et al. | 123/192.1 |
| 5,125,236 | 6/1992 | Clancey et al. | 62/115 |
| 5,126,641 | 6/1992 | Putman et al. | 318/128 |
| 5,175,439 | 12/1992 | Härer et al. | 307/10.1 |
| 5,303,794 | 4/1994 | Hrovat et al. | 180/197 |
| 5,323,743 | 6/1994 | Kristiansson | 123/179.3 |
| 5,325,042 | 6/1994 | Murugan | 322/10 |
| 5,359,308 | 10/1994 | Sun et al. | 335/216 |
| 5,431,241 | 7/1995 | May et al. | 180/197 |
| 5,873,801 | 2/1999 | Taga et al. | 477/5 |

FOREIGN PATENT DOCUMENTS

| | | |
|---|---|---|
| 0 530 659 A1 | 3/1993 | European Pat. Off. |
| 0 557 522 A1 | 9/1993 | European Pat. Off. |
| 0 569 347 A2 | 11/1993 | European Pat. Off. |
| 0 604 979 A2 | 7/1994 | European Pat. Off. |
| 0 612 928 A1 | 8/1994 | European Pat. Off. |
| 2481656 | 11/1981 | France. |
| 2563280 | 10/1985 | France. |
| 282 671 | 8/1912 | Germany. |
| 874 713 | 6/1952 | Germany. |
| 893 299 | 1/1953 | Germany. |
| 904 737 | 6/1953 | Germany. |
| 938 680 | 6/1954 | Germany. |
| 1 077 072 | 3/1960 | Germany. |
| 1 156 319 | 10/1963 | Germany. |
| 1 165 422 | 3/1964 | Germany. |
| 1 284 853 | 12/1968 | Germany. |
| 23 45 018 A1 | 4/1974 | Germany. |
| 23 53 724 B2 | 5/1974 | Germany. |
| 295 02 906 U1 | 4/1975 | Germany. |
| 27 04 533 A1 | 8/1978 | Germany. |
| 28 55 886 A1 | 6/1979 | Germany. |
| 29 02 376 C2 | 7/1979 | Germany. |
| 28 23 225 A1 | 11/1979 | Germany. |
| 29 17 139 A1 | 11/1980 | Germany. |
| 29 43 563 A1 | 5/1981 | Germany. |
| 30 09 503 A1 | 9/1981 | Germany. |
| 30 13 424 A1 | 10/1981 | Germany. |
| 30 48 972 C2 | 7/1982 | Germany. |
| 30 50 269 A1 | 10/1982 | Germany. |
| 32 30 121 A1 | 2/1984 | Germany. |
| 32 30 607 A1 | 2/1984 | Germany. |
| 32 43 513 A1 | 5/1984 | Germany. |
| 33 43 018 C2 | 6/1984 | Germany. |
| 32 43 514 C2 | 9/1984 | Germany. |
| 33 35 923 A1 | 9/1984 | Germany. |
| 33 38 548 A1 | 5/1985 | Germany. |
| 35 37 994 A1 | 5/1986 | Germany. |
| 37 37 192 A1 | 7/1988 | Germany. |
| 38 14 484 A1 | 11/1988 | Germany. |
| 37 43 289 A1 | 6/1989 | Germany. |
| 37 43 317 C3 | 6/1989 | Germany. |
| 38 12 296 A1 | 11/1989 | Germany. |
| 39 37 082 A1 | 5/1990 | Germany. |
| 39 26 054 A1 | 2/1991 | Germany. |
| 40 27 664 A1 | 3/1991 | Germany. |
| 39 39 695 C1 | 5/1991 | Germany. |
| 40 38 301 A1 | 6/1991 | Germany. |
| 40 00 678 A1 | 7/1991 | Germany. |
| 41 00 937 A1 | 8/1991 | Germany. |
| 40 11 291 A1 | 10/1991 | Germany. |
| 41 34 268 A1 | 4/1992 | Germany. |
| 42 13 132 A1 | 11/1992 | Germany. |
| 41 24 496 A1 | 1/1993 | Germany. |
| 42 02 083 A1 | 7/1993 | Germany. |
| 42 02 737 A1 | 8/1993 | Germany. |
| 42 30 510 C1 | 9/1993 | Germany. |
| 42 25 683 A1 | 2/1994 | Germany. |
| 43 30 193 A1 | 3/1994 | Germany. |
| 43 18 949 C1 | 6/1994 | Germany. |
| 43 39 252 A1 | 6/1994 | Germany. |
| 43 91 898 C2 | 6/1994 | Germany. |
| 43 44 053 A1 | 7/1994 | Germany. |
| 43 11 697 A1 | 10/1994 | Germany. |
| 43 14 290 A1 | 11/1994 | Germany. |
| 43 23 601 A1 | 1/1995 | Germany. |
| 43 23 602 A1 | 1/1995 | Germany. |
| 44 04 791 C1 | 3/1995 | Germany. |
| 44 02 152 C1 | 4/1995 | Germany. |
| 44 37 322 A1 | 5/1995 | Germany. |
| 44 21 512 C1 | 6/1995 | Germany. |
| 44 08 719 C1 | 7/1995 | Germany. |
| 44 23 577 A1 | 8/1995 | Germany. |
| 44 12 945 A1 | 10/1995 | Germany. |
| 44 12 438 C1 | 11/1995 | Germany. |
| 55-005454 | 1/1980 | Japan. |
| 58-126434 | 7/1983 | Japan. |
| 59-184020 | 10/1984 | Japan. |
| 61-61926 | 3/1986 | Japan. |
| 61-61927 | 3/1986 | Japan. |
| 61-066820 | 8/1986 | Japan. |
| 61-200333 | 9/1986 | Japan. |
| 62-166749 | 7/1987 | Japan. |
| 1113571 | 5/1989 | Japan. |
| 1190922 | 8/1989 | Japan. |
| 4024156 | 1/1992 | Japan. |
| 05211258 | 8/1993 | Japan. |
| 07105943 | 4/1995 | Japan. |
| 20 42 772 | 9/1980 | United Kingdom. |
| WO 88/08636 | 11/1988 | WIPO. |
| WO 91/16538 | 10/1991 | WIPO. |
| WO 94/19856 | 9/1994 | WIPO. |
| WO 95/02758 | 1/1995 | WIPO. |
| WO 95/24072 | 9/1995 | WIPO. |

OTHER PUBLICATIONS

D. Teodorescu, "Kleinantriebe mit Vollpolläufer–Synchronmotoren", ema, May 1993, pp. 39–43.

Manfred Weck, Studium Und Praxis, Werkzeugmaschinen Fertigungssysteme Band 3.2 Automatisierung und Steuerungstechnik 2, VDI Verlag, Apr. 1995, pp. 8 pgs. total.

N. Saridakis, "Golf mit Otto–Elektro–Hybridantrieb", ATZ, Atutomobiltechnische Zeitschrift 87 (1985) 11, pp. 581–584.

H. Baumann, Siedekühlgefäss mit Luftrühlung für Traktionsstromrichter hoher Leistung:, etzArchiv, vol. 11, 1989, No. 7, pp. 213–220.

E. Blessmann, "Magnetic Couplings", Machine Design, Feb. 9, 1989, pp. 105–108.

Robert Bosch GmbH, "Kraftfahrtechnisches Taschenbuch", VDI–Verlag, Düsseldorf, 21 ed. 1991, pp. 346–347; 361; 555–559; 763–767.

H. Deisenroth, C. Trabert: "Vermeidung von Überspannungen bei pulsumrichterantrieben" etz, vol. 114, 1993, No. 17, pp. 1060–1067.

W. Geissler, F. Unger–Weber: "Modelling the Three–Phase Propulsion System of a Modern Multisystem–Locamotive", EPE Firenze, (1991), pp. 4–632–4 637.

DRIVE SYSTEMS, ESPECIALLY FOR A MOTOR VEHICLE, AND METHOD OF OPERATING SAME

This is a continuation of PCT/DE96/01617 filed on Aug. 31, 1996 which claims priority from German Patent Application No. 195 32 128.6 filed on Aug. 31, 1995.

BACKGROUND OF THE INVENTION

1. Field of the Invention

The present invention relates to methods and apparatus for correcting for non-uniformities occuring in the rotation of the drive shaft of a drive system.

2. Description of the Related Art

Especially in drive systems which have an internal combustion engine as the drive assembly, nonuniformities generally occur in the rotation of the drive shaft of the engine, which are primarily caused by the gas and mass forces of the engine. Such rotational nonuniformities can impair the driving comfort and lead to wear on the drive system, as well.

Therefore, it has already been proposed to outfit an internal combustion engine of a motor vehicle with a system for active reduction of rotational nonuniformities. The action of such a system is based on the fact that an electric machine or an electric brake generates a torque which alternates or also only pulsates in one direction, which is directed opposite the rotational nonuniformities and thereby reduces them. Examples of such systems are disclosed by Patent Abstracts of Japan, Volume 11, No. 28 (M-557), 27 Jan. 1987 & JP-A-61 200 333 (NISSAN I), Patent Abstract of Japan, Volume 4, No. 29 (M-002),14 Mar. 1980 & JP-A-55 005 454 (TOYOTA), EP-B-0 427 568 (ISUZU), DE-A-32 30 607 (VW), EP-B-0 175 952 and U.S. Pat. No. 699 097 (MAZDA), Patent Abstracts of Japan, Volume 7, No. 240 (M-251), 25 Oct. 1983 and JP-A-58 126 434 (NISSAN II), DE-A-41 00 937 (FICHTEL & SACHS), EP-A-0 604 979 (NIPPONDENSO), EP-A-0 385 311 (NISSAN/HITACHI), EP-A-0 338 485 (HITACHI) and U.S. Pat. No. 5 109 815 (HITACHI II).

The following more remote state of the art is cited: DE-B-43 91 898, DE-A-27 04 533, EP-A-0 437 266, DE-A-44 37 322, DE-A-40 11 291, DE-A-32 43 513, DE-A-38 14 484, DE-A-33 38 548, DE-B-44 08 719, DE-A-39 37 082.

In the correspondingly equipped drive systems, therefore, an active reduction of rotational nonuniformities is basically possible

SUMMARY OF THE INVENTION

The invention concerns a drive system, especially for a motor vehicle, with a drive assembly, especially an internal combustion engine (1), and at least one electric machine (4) for active reduction of rotational nonuniformities, acting on the drive assembly, in particular, its drive shaft (10) or a shaft coupled or which can be coupled to it, wherein at least one sensor (16, 32) of the drive system and/or at least one quantity derived from sensor information serves both to control the drive assembly and also to control the electric machine (4), and/or wherein a control unit (31 and 33, respectively) responsible for the control of the electric machine (4) or of the drive assembly also partly or entirely controls the drive assembly or the electric machine (4), respectfully. The invention is also oriented to a method of operating such a drive system.

BRIEF DESCRIPTION OF THE DRAWINGS

The invention shall now be explained more closely by means of sample embodiments and the enclosed schematic drawing. The drawing shows.

DETAILED DESCRIPTION OF THE EMBODIMENT

The invention starts with the technical problem of further modifying and/or simplifying such drive systems.

It solves this problem with a drive system, especially for a motor vehicle, with a drive system, especially an internal combustion engine, and at least one electric machine for active reduction of rotational nonuniformities, acting on the drive assembly, and in particular, its drive shaft or a shaft which is coupled or can be coupled to it, Wherein at least one sensor of the drive system and/or at least one quantity derived from sensor information serves both to control the drive assembly and also to control the electric machine, and/or wherein a control unit responsible for the control of the electric machine or of the drive assembly also partly or entirely controls the drive assembly or the electric machine, respectfully (claim 1). The term "control" shall be understood here in a broad sense, which besides "control" in the narrow sense ("without feedback" [or open-loop control]) also encompasses "regulation" ("with feedback" [closed-loop control]).

In particular, rotational nonuniformity can be such as occurs in an internal combustion engine, particularly a piston engine with internal combustion, through the gas and mass forces of the individual pistons acting on the drive shaft (i.e., especially the crankshaft). For example, in a four-cylinder four-stroke engine, relatively large rotational nonuniformity occurs in the second order (i.e., twice the rotational frequency of the engine). Furthermore, there is rotational nonuniformity at higher orders, as well as stochastically occurring nonuniformities. The internal combustion engine can be, e.g., a two-stroke or a four-stroke engine with an even number of cylinders (e.g., 2, 4, 8, 10, 12 cylinders, etc.) or an odd number of cylinders (1, 3, 5, 7, 9, 11, etc., cylinders) (which may operate by the Otto or the Diesel principle). In theory, it can also be a different kind of internal combustion engine, such as a piston engine with external combustion (so-called Stirling engine). Another possibility is a rotary engine (e.g., a Wankel engine), in which at least the gas forces can produce rotational nonuniformity. Moreover, one can consider turbines, especially gas or steam turbines. Although the rotational nonuniformities in these are generally slight, for certain applications, however, especially good true running is needed.

Yet the rotational nonuniformities need not come (exclusively) from the drive assembly (e.g., of a motor vehicle, rail vehicle, or ship). Rather, they can also be such as arise in a drive train—i.e., between the drive assembly and the takeoff point, say, from universal joints, three-dimensional shaft vibrations, or transmission wear.

The drive system can also be outfitted with several electric machines for active reduction of rotational nonuniformity, e.g., a first machine in a motor vehicle could act directly on the drive shaft of the drive assembly, while a second machine downstream from a coupling, e.g., between coupling and transmission, serves to reduce rotational nonuniformity of the drive train.

An "electric machine" is any kind of machine for rotational movement, which can be operated as both an electric motor and an electric brake, or a generator if necessary.

In theory, the coupling of the electric machine to the drive assembly can be indirect, e.g., through a transmission. Preferably, however, the coupling is direct, in which, for example, the rotor of the electric machine—similar to a flywheel—is mounted directly on the drive shaft of the drive assembly or perhaps an extension of this shaft that can be coupled in.

Whereas in the state of the art cited at the outset the rotational nonuniformity reduction system is conceived as an auxiliary system independent of the drive assembly, the invention instead teaches how to use one or more elements of the drive system jointly for the control of the two subsystems, i.e., the drive assembly and the electric machine. A transmission control, say, that of an automatic transmission, is also assigned to the drive assembly control here. Thus, the joint use of control elements also refers to the pair consisting of electric machine and transmission.

The commonly used element can be, on the one hand, a sensor (e.g., a (crank) shaft angle sensor or a torque measuring device) and/or quantities derived from sensor information (e.g., a rotary velocity or change in torque derived therefrom), which are jointly assigned to separate control units for the drive assembly and the electric machine. On the other hand, it can also be a control unit itself, which is responsible for controlling the electric machine or the drive assembly and, in addition, also controls partly or entirely the drive assembly or the electric machine. Of course, it is also possible to combine these two aspects of joint usage, i.e., to use at least one sensor or one quantity derived from sensor information and a control unit jointly for the control of the electric machine and the drive assembly.

The fact that the two subsystems have totally different functions at first seems to suggest an independent control of them, as is proposed in the state of the art. On the other hand, the joint usage according to the invention is based on the knowledge that, given the totally different requirements on the two subsystems, many sensors or quantities derived from sensor information of one subsystem need to work more precisely and/or faster than those of the other, and also that the control unit of one of the two subsystems works more precisely and faster than that of the other subsystem at least as regards many control problems. For example, a very high-resolution crankshaft angle sensor can be provided for the reduction of rotational nonuniformity, from which the instantaneous drive shaft angle and possibly also the instantaneous rotational velocity is quickly and accurately derived; the use of these control elements can be advantageous in the drive assembly's control (e.g., control of the ignition and/or start of injection time). The same holds when, for example, one of the subsystems has a very high-performance and fast control or regulation unit, e.g., in the form of a high-performance computer system. For example, a very high-frequency control unit of the electric machine can lead to a speed gain in the control or regulation of the drive assembly. Moreover—if a control in one or both subsystems is based on (feedback) regulation—control interference and instability can result in certain cases with independent control of the two subsystems, which is prevented by the joint control.

Thus, the drive system according to the invention has the following benefits:

it allows a more precise and faster control;
it helps avoid control interference and instabilities; and
it simplifies the entire system and thus leads to cost savings and reduction of interference sources.

Preferably, the jointly used sensor measures one or more of the following quantities and/or the jointly used quantity derived from sensor information is one of the following quantities: drive shaft angle position or rotary speed or angular acceleration, load condition, temperature, exhaust composition, quantity or mass of combustion air, throttle valve position, fuel quantity, injection time, gas pressure, all of these for the drive assembly; current used to drive the electric machine, intermediate-circuit voltage, frequency, phase, switching states of the invertor switches, all of these for the invertor (if present); angle position, rotary speed, angular acceleration, torque, all of these for the electric machine; velocity, lengthwise and transverse acceleration, all of these for the vehicle; rotary speed of the transmission takeoff shaft; angle position, rotary speed, angular acceleration, these being for one or more wheels of the vehicle; slip for one or more drive wheels; cylinder shutoff and/or turn on signal. From the electrical quantities of current, intermediate-circuit voltage frequency, phase, and/or from switch states of invertor switches, a conclusion can be drawn as to the instantaneous flux, the instantaneous torque, and the instantaneous rotary speed without additional sensors.

The joint control of the two subsystems need not permanently exist. Instead, it may be advantageous for the control unit responsible for controlling the electric machine or the drive assembly to partially or entirely control the drive assembly or the electric machine, respectively, only during certain operating states. For example, if in idling operation of the drive assembly a drive assembly control unit tries to maintain the idling speed constant by feedback regulation and at the same time the electric machine for reduction of rotational nonuniformity exerts alternating torques on the drive shaft, control interference may result. If, instead, one lets the control unit responsible for the electric machine also take over the control of the idling speed of the drive assembly (or vice versa), one can preclude such control interference. In other operating states beyond idling, the control of the two subsystems can be managed separately.

The control unit responsible for the control of the electric machine is generally very fast and powerful—especially when it is actuating an invertor—and can therefore advantageously take on one or more of the following control tasks, in whole or in part, for control (or feedback regulation) of the drive assembly: rotary speed control (especially in idling), fuel supply control, throttle valve control (especially in idling), fuel injection control, ignition control, valve control (for engines with adjustable valve control times or electromagnetically activated valves), cooling control (e.g., in drive systems with high coolant temperature level (e.g., 130° C.) and active cooling), exhaust gas cleaning control (e.g., lambda control), exhaust gas recycling control, knocking regulation, charging pressure regulation, cylinder shutdown, start/stop control, transmission control.

Basically, however, it is also possible for the control unit responsible for controlling the drive assembly to partly or entirely take over one or more of the following control tasks for control of the electric machine: torque control, direct or indirect actuation of invertor switches (in electric machine controlled by invertor), control of a starter function (if the electric machine also functions as a starter), control of an auxiliary torque function, especially a generator function (if the electric machine is also functioning as a generator) or an electromagnetic coupling and/or synchronizer function (if the electric machine executes these functions).

Moreover, these two possibilities are identical in scope at the limit, since a common control unit can take on the overall control of both the drive assembly and the electric machine.

Advantageously, the electric machine is a rotary-field or traveling-wave machine. By "rotary-field machine"—in contrast with a commutator machine—is meant a machine in which a rotary magnetic field occurs. This can be, for example, an induction or synchronous machine, especially for three-phase current, or a machine with electronic commutation. In a rotary-field machine, the magnetic field sweeps through a complete 360° revolution, while in a traveling-wave machine it only sweeps through one or more segments. Thus, for example, the traveling-wave machine can be an induction or synchronous machine whose stators extend only across one or more sectors of the rotor—resembling one or more curved linear motors.

The drive system preferably has at least one invertor for generating the voltages and/or currents of variable frequency, amplitude and/or phase required for the magnetic fields of the machine. The invertor can generate the voltages and/or currents needed for the magnetic fields (in particular, rotary or traveling fields) with any desired (within certain limits) frequency, amplitude or phase, or any desired combination of these quantities. It can do this advantageously by means of electronic switches from a predetermined dc or alternating voltage or a predetermined direct or alternating current (so-called invertor drive). To special advantage, all three quantities—frequency, amplitude and phase—are freely selectable. An invertor drive generally has the advantage of effectively reducing the most diverse rotational nonuniformity with high variability during the most diverse operating conditions and almost totally suppressing it in many instances, being able to easily produce a desired superpositioning of an additional torque with the desired strength, when necessary.

Basically, the electric machine can be controlled such that it either only counteracts rotational nonuniformities toward speeding up (so-called positive rotational nonuniformities) or those toward slowing down (so-called negative rotational nonuniformities). However, an especially effective operation is one in which it counteracts both negative and positive rotational nonuniformities. Here, the electric machine is preferably controlled such that it produces a rapidly alternating torque to reduce the rotational nonuniformity, namely, a braking torque for a positive rotational nonuniformity and a driving torque for a negative rotational nonuniformity, onto which it can advantageously superimpose, at least some of the time, a positive or negative torque to further achieve a driving action or a braking or generator-type action. For configurations in which the electric machine also acts as an electromagnetic coupling, a rapidly varying coupling slip of larger or smaller magnitude can take the place of the rapidly alternating braking and driving torque.

By "rapid variation" is meant a variation in the frequency range of the rotational nonuniformity being reduced, i.e., for the second-order rotational nonuniformity at a rotary speed of 3000 min$^{-1}$ a variation with a frequency of 100 Hz. On the contrary, the possibly superimposed additional torque generally varies slowly or is constant—apart from possibly steep edges at the beginning or end of the superpositioning.

Thanks to the (especially additive) superpositioning of the additional torque in the desired direction and strength, the reduction of the rotational nonuniformity and the generation of the additional torque are decoupled from each other. The rapidly varying torque is practically unchanged in its duration by the superpositioning, being only shifted relative to the zero line. As an exception, the rapidly varying torque changes only if the internal combustion engine actually shows an altered rotational nonuniformity on account of the change in load accompanying the switching in of the additional torque.

If the additional torque being furnished at the moment is smaller than the amplitude of the alternating torque at that time, the combined torque of the electric machine shows alternately positive and negative values—albeit shifted with respect to the zero line. If, on the other hand, it is larger than such, the combined torque is only positive or negative, and its magnitude contains a rapidly varying component. An additional braking torque can serve to make the electric machine diminish the coupling slip, perform a braking synchronizer function, act as a generator for current supply and/or produce or sustain a braking of the vehicle and/or reduce the slip of a drive wheel by braking, perhaps as part of an antislip control. The braking energy (additional torque brake energy) obtained when using these brake functions as a generator can be saved up—like that resulting from rotational nonuniformity—(for example, in an electrical accumulator or in a flywheel accumulator) and later used as drive energy or be furnished to a power grid or, for example, the vehicle's battery. An additional drive torque can serve an accelerating synchronizer function or sustain (when the electric machine functions as a "booster") or produce an acceleration of the vehicle, for example, to cover acceleration gaps, as in the case of a turbocharged engine.

In order to achieve the highest possible overall efficiency of the system, the energy obtained when reducing a positive rotational nonuniformity (rotational nonuniformity brake energy) and possibly the energy obtained from the additional braking torque (additional torque brake energy) is advantageously at least partially saved up and the saved rotational nonuniformity brake energy is at least partially used later on to reduce a negative rotational nonuniformity.

The saving of the rotational nonuniformity brake energy and possibly the additional torque brake energy can be done in particular by an electrical accumulator and/or a mechanical accumulator (flywheel accumulator). The electrical accumulator can be, in particular, a capacitance, an inductance or a (fast-acting) battery. Advantageously, the invertor (if present) is an intermediate-circuit invertor, whose intermediate circuit has at least one electrical accumulator for brake energy or is coupled to at least one such accumulator. The accumulator can either serve exclusively for the accumulation of brake energy (in this case, it will be switched in generally in addition to a normally present intermediate accumulator, which can furnish the necessary voltage or current pulse during the invertor's operating cycle), or it can serve only partially for the accumulation of the brake energy, i.e., save up yet other energy—which may be needed for the operating cycle (in the latter case, it could coincide with the usual intermediate-circuit accumulator). Moreover, it may be advantageous in any case to design the rectifier as an intermediate-circuit rectifier—for example, even without intermediate accumulation of brake energy.

By an "intermediate circuit" is meant a circuit which can supply essentially dc voltage or direct current, from which an invertor component (the so-called machine invertor) can form variable alternating voltage or current by pulse or cycle operation. This dc voltage or direct current must provide voltage or current pulses with extreme edge steepness and at high voltage or current level. Generally speaking, an intermediate-circuit invertor comprises three subassemblies, namely, an input subassembly for supplying or taking away electrical energy, an output subassembly in the form of the machine invertor, and the intermediate circuit which comes between these.

In the case of the flywheel accumulator for storing up the brake energy, the flywheel is preferably electrically coupled to the system by a (second) electric machine. This can be, for example, a rotary-field or commutator machine controlled by its own rectifier. The electric machine for reducing the rotary nonuniformity and the flywheel machine work in opposite cycle: when the former is braking, the latter is accelerating the flywheel, and when the former is driving or not braking so much, the latter is braking the flywheel. Relatively high energy densities can be built up with such a flywheel energy accumulator.

The (first) electric machine, in addition to the active reduction of rotational nonuniformity, can also perform other functions at the same time or staggered in time and thus replace machines which are traditionally specialized in these functions. In particular, it can also have the function of a starter, e.g., for an internal combustion engine coupled to the shaft, and/or the function of a generator for electricity supply, e.g., to charge a battery or energize a power grid. During the starting process, it is generally not necessary to reduce rotational nonuniformity; for this, the electric machine will be operated temporarily as a pure electric motor. On the other hand, the generator function is generally also desirable when reducing rotational nonuniformity. Averaged out over time, a gain in electric energy is achieved by superimposing the rapidly varying torque with a simultaneously braking torque.

Basically, the electric machine can be configured as a flywheel starter for the starting function (see, e.g., D. Henneberger "Electrical Engine Equipment", Braunschweig 1990, pp. 98–103). Advantageously, however, it is designed so torque-robust that it can serve as a direct starter, i.e., it can start the drive assembly by merging in from standstill. Preferably, it is directly coupled to the drive shaft, i.e., without a transmission. The rotary speed of the rotor then preferably equals that of the drive assembly.

In corresponding manner, the electric machine can also produce or sustain an acceleration and/or braking of the shaft as an additional function. For example, this can serve to accelerate a motor vehicle, along with the drive assembly. For braking a vehicle, the electric machine can serve as a wear-free, possibly generator-type brake or extra brake. In combination with an antislip control, the electric machine can quickly reduce the total drive torque and, thus, the slip of one or more drive wheels by braking. In electromagnetic coupling function, the drive wheel slip can be reduced by increasing the coupling slip, instead of by braking. When performing these additional functions, it is possible to switch off the function of reducing the rotational nonuniformity, or both functions can be implemented at the same time, by superimposing an appropriate driving and braking torque—as explained above.

The brake energy obtained when employing these additional functions can be saved (e.g., in the electric accumulator or in the flywheel accumulator)—like that resulting from rotational nonuniformity and later used as drive energy or be supplied to a network or, for example, the car battery.

In order to achieve the highest possible efficiency of brake energy recycling when braking the vehicle by means of the electric machine, it is advantageous to separate the electric machine from the drive assembly by means of an intervening, e.g., mechanical coupling during braking.

To supply high-power consumers, such as auxiliary machines (air conditioners, servo-drives, pumps) and heating systems, it is advantageous that the electric machine furnish current at relatively high voltage level, preferably in the upper part of the low voltage region, where no special electrocution protection measures are necessary (e.g., around 60 V dc voltage). If one goes beyond this, a range of 250–450 Volts is preferably selected. Advantageously, the high-power consumers are operated or heated electrically (instead of mechanically, as heretofore, or by using waste heat) at these high voltage levels. Such high voltage levels can already exist, in particular, in the intermediate circuit of an intermediate-circuit invertor, and thus need not be specially generated for this additional purpose. For low-power consumers, a traditional low-voltage network (12 V or 24 V) can be provided.

The active reduction of rotational nonuniformity—as mentioned—is based on the fact that the electric machine can counteract positive and negative rotational nonuniformity, and thus acts as a brake for positive and/or as a drive for negative rotational nonuniformity. For this, the control device requires information about the time and possibly the magnitude of a positive or negative rotational nonuniformity.

One possibility of obtaining this information lies in a measuring of the momentary rotational nonuniformity or another quantity connected to it. If the operation of the electric machine is based on this information, we have an automatic feedback control, since the actual presence of a rotational nonuniformity leads to an immediate action on this rotational nonuniformity.

Another possibility is to use not the actual, but rather an expected rotational nonuniformity as information for operating the electric machine. Thus, we have here a nonfeedback control. For example, in an internal combustion engine, one can determine the magnitude and direction of the momentary rotational nonuniformity as a function of the (crank) shaft angle and one or more operating parameters (such as rotary speed and throttle valve position) by using a prototype or simulation on a computer and outfit each mass produced engine with this information saved in the form of a characteristic diagram. During operation, the system then measures the momentary crankshaft angle present and the other operating parameters (such as rotary speed and throttle valve position), reads the corresponding memorized diagram values for magnitude and amplitude of the anticipated rotational nonuniformity, and controls the electric machine through the control device in order to counteract the rotational nonuniformity.

Furthermore, an adaptive control is possible, i.e., a non-feedback control in which the control information is not fixed, but rather defined or at least modified by measuring earlier rotational nonuniformities.

Moreover, mixed forms of the mentioned kinds are possible, e.g., the expectation values memorized in a characteristic diagram may be adaptive with respect to an anticipated quantity (such as the amplitude), while they can be fixed with respect to another expected quantity (say, shaft angle). Also, a very advantageous combination is an automatic control with servocontrol, in which the automatic control in each control interval is first adjusted to an expected rotational nonuniformity value from a characteristic diagram (servocontrol) and then works off the generally slight deviations between the actual value and the preset value (automatic control). This type of control provides a very fast and exact regulation with relatively low expense. It may also be advantageous to work with automatic (feedback) control at low speeds (e.g., idling), and to switch to open-loop (nonfeedback) control at higher speeds.

In automatic control, adaptive open-loop control, and corresponding mixed forms, the metered quantity need not immediately be the rotational nonuniformity (possibly derived from a measurement of the angle position or angular velocity as a function of time). Instead, it can also be one (or more) other quantities which allow a conclusion as to at least some of the rotational nonuniformities occurring. In an internal combustion engine, this quantity can advantageously be the gas pressure in one or more engine cylinders. For the gas pressure is a major variable source of rotational nonuniformities. Furthermore, another important, practically unchangeable source should be taken into account—the mass forces. Their magnitude can be permanently saved in a characteristic diagram. As an alternative (or supplement), the momentary torque of the engine can be measured, e.g., by means of a torque hub. Thus, using the gas pressure and/or the momentary torque as a metered quantity enables a relatively simple and fast automatic control, adaptive open-loop control, or corresponding mixed form. The gas pressure and/or the instantaneous torque can also represent a useful quantity for control of the internal combustion engine.

The electric rotary-field machine or traveling-wave machine (or linear machine) of the system is preferably an induction machine, a synchronous machine, or a reluctance machine, especially for three-phase current. An induction machine generally has a relatively simple rotor (generally a rotor with short-circuit windings or windings whose ends go to slip rings). On the other hand, synchronous machines have rotors with distinct magnetic poles, which are generated by permanent magnets or current. Reluctance machines belong to the synchronous machines in the broad sense. In particular, the control of the electric machine in the case of the induction machine is preferably based on a field-oriented automatic control (so-called vector control). Starting with directly measurable momentary quantities, such as the imposed voltage, stator current, and perhaps rotary speed, using a computerized dynamic machine model, the stator current is broken down into a torque-forming component, which generates the torque with the rotor flux, and a component perpendicular to this, generating the machine flux, thus determining the torque.

The (sub)system for active reduction of rotational nonuniformities is generally an auxiliary system, which is arranged, for example, in the drive train of a motor vehicle with the drive assembly. Because of its auxiliary nature, it should take up little space relative to the drive assembly and therefore should be as compact as possible. The advantageous measures mentioned hereafter serve such a compact construction - besides other advantageous purposes.

One step for achieving good compactness is for the electric machine to have a fine pole division, in particular, at least one pole per 45° angle of the stator. In a full-circle (360°) machine, this corresponds to a total of at least 8 poles. Even smaller polar divisions are especially advantageous, corresponding to 10, 12, 14, 16 or more poles in the closed-circle machine. A fine polar division allows the stator winding heads to be small, both in the axial and the peripheral direction of the machine, so that the machine can be shorter overall in the axial direction. Also, with a finer pole division, the stator back for the return magnetic flux can be thinner (and, thus, also lighter), with the result that the rotor can have a larger diameter for the same outer diameter of the machine. A larger rotor diameter leads to a larger torque, on account of the longer air gap in the peripheral direction and the larger active lever arm. Thus, on the whole, a finer pole division leads to a lighter and more compact machine. In addition, the resistive losses are less on account of the shorter length of the winding wires—smaller winding heads require less nonactive winding wire. Since, moreover, the stray field (which essentially determines the reactive power component) depends on the winding head surface, it is relatively slight for a fine pole division. A slight stray field is especially advantageous for reducing the rotational nonuniformity, because in this case—unlike a conventional electric machine—there is an ongoing alternation between engine and generator operation and reactive power must be continuously consumed with the corresponding pole reversal.

Fine pole divisions are not customary for high-speed rotary-field machines, since they result in a relatively high frequency of pole reversals. A customary value for the pole reversal frequency is 120 Hz, for example. The electric machine used in the context of the invention, on the other hand, advantageously has a high maximum pole reversal frequency, preferably between 300 and 1600 Hz or more, especially preferably between 400 Hz and 1500 Hz.

In order to lessen the influence of eddy currents in the stator—which increase with higher pole reversal frequency—the stator preferably has thin stator plates, preferably with a thickness of 0.35 mm or less, especially preferably 0.25 mm or less. As a further measure for diminishing the losses, the stator plates are preferably made from a material with low remagnetization losses, especially less than 1 W/kg at 50 Hz and 1 Tesla.

As a further measure contributing to a compact construction, the electric machine preferably has an inner fluid cooling. The fluid can be preferably oil. A very effective cooling technique consists in placing the machine entirely under oil in the interior. However, a disadvantage of this is that turbulence losses occur above around 500 rpm, and these can take on noticeable extent above roughly 2000 rpm. In order to counteract this, the supply of cooling fluid is preferably dependent on the loss power and/or rotary speed, and the fluid cooling is preferably a spray fluid cooling. There is then always only as much cooling fluid in the machine as is required at the time to carry away the loss power. The spray fluid cooling ensures an especially good distribution of the fluid.

Quantitatively, the compactness can be expressed in terms of the "torque density." Preferably, the electric machine has a high torque density—as compared to the maximum torque—which is especially preferably greater than 0.01 $Nm/cm^3$.

Radial vibrations can also often occur on a shaft with rotational nonuniformities, especially crankshafts. In order to be robust to radial vibrations, the system is preferably designed such that the electric machine works far into the region of magnetic saturation. A measurement of the magnetic saturation is the current coverage (at maximum torque) in the stator per centimeter length of the air gap in the peripheral direction. Preferably, this measure amounts to at least 400–1000 A/cm, especially preferably at least 500 A/cm. Operation far into the saturation range makes it possible to design the machine with relatively broad air gap. Changes in the air gap—such as occur during radial vibrations—have little effect, due to the operation in the saturation range.

Such a compact-construction electric machine generally has relatively low inductance. Yet in order to achieve, for example by means of a synchronized voltage, the most precise sinusoidal current to generate the electrical rotary fields or traveling waves, the invertor here preferably works at least sometimes with a high cycle frequency, in particular, 10 kHz to 100 kHz or more. This provision is also advantageous for achieving a high temporal resolution for the system; for example, with a cycle frequency of 20 kHz, one can achieve a temporal resolution in the torque behavior of the electric machine of 2 kHz, with which one can effectively reduce a rotational nonuniformity at 200 Hz (200 Hz corresponds, for example, to the fourth order at 3000 rpm). A high cycle frequency, moreover, also contributes to a compact construction for the invertor itself, since it allows smaller intermediate circuit capacitors, which can be placed directly next to the electronic switches with short conductor pathways. Moreover, EMC (EMC: electromagnetic compatibility) filters of the invertor can be smaller.

As a further advantageous provision for achieving a compact construction of the invertor, electronic switches of the invertor are fluid-cooled, preferably boiling bath cooled. As the boiling bath coolant, one can use a fluorohydrocarbon, for example. In boiling bath cooling, the coolant evaporates at hot spots and in this way obtains its relatively high heat of evaporation from them. The vapor rises and can condense, for example, in an external cooler, thereby surrendering its heat of evaporation. This cooling technique enables the most compact arrangement of the electronic switches of the invertor without any cooling body. Furthermore, it has the advantage that relatively slight temperature differences are enough to achieve even high cooling performance, namely, e.g., a difference of 2–10° C., as compared to 40° C. for air cooling. Another advantageous cooling technique consists in connecting several electronic switches of the invertor, especially 2–20 or more, in parallel. The parallel circuit yields a distributed arrangement of heat sources and, thus, a relatively low loss power density.

The invertor preferably contains semiconductor elements as switches, preferably fast semiconductor switches, such as field effect transistors—especially preferably metal oxide semiconductor (MOS) field effect transistors, bipolar transistors, and/or bipolar transistors with insulated gate connection (IGBTs). By "fast" semiconductor switches are meant, in particular, ones which allow maximum clock frequencies of 10–100 kHz or more.

The invertor generates the voltages and/or currents necessary for the magnetic fields of the electric machine, preferably through pulses, especially on the basis of pulse width or pulse amplitude modulation. With constant intermediate circuit voltage, nearly sinusoidal currents of arbitrarily adjustable frequency, amplitude, and/or phase can be generated by sine-evaluated pulse width modulation at high clock frequencies, thanks to the machine inductance. In pulse amplitude modulation, one starts, for example, with an invertor with variable intermediate frequency voltage and thus generates pulses of different amplitude.

In advantageous configurations of the invention, the electric machine can also function as an electromagnetic coupling in the drive train. In an "electromagnetic coupling," the transmission of torque occurs through the coupling by electrical, magnetic, or electromagnetic forces. It is possible for this type of force transmission to occur only temporarily, for example, after achieving the same rotary speed for the shafts being coupled the force transmission can be taken over by a mechanical coupling.

Basically, the function of the electromagnetic coupling can be achieved by two electric machines, the first of which serves as a generator, the second as a motor energized by the generator current. In one advantageous configuration, the coupling is formed by a single electric machine, which has at least two rotary electromagnetic active units, one of which is coupled or can be coupled to a torque transmitter at the drive end and the other to a torque transmitter at the takeoff end. The torque transmitters are generally a drive shaft and a takeoff shaft, say, the drive shaft of the drive assembly or a shaft coupled to it and the shaft leading from the electric machine to the transmission. The electromagnetic active units correspond to the rotor and stator of the normal electric machine, but with the difference that the stator as well as the rotor can turn here. Thus, the machine corresponds to a normal machine with rotor and stator, wherein the machine can turn as a whole in addition to the rotor's rotation. The rotating machine can generate positive and negative relative torques between rotor and "stator". In this way, the clutch slip can be influenced and various clutch effects can be achieved: for example, the electric machine can be regulated such that a relative torque is adjusted between rotor and stator, which corresponds to that being transmitted at the moment in the drive train, so that the clutch slip vanishes (zero clutch slip). The electric machine then transmits rotary speed and torque unchanged—corresponding to a closed mechanical coupling. But the electric machine can also be regulated such that the relative torque between rotor and stator vanishes and a clutch slip corresponding to the relative rotary speed of the torque transmitters is adjusted. In this way, one accomplishes a complete separation of them without torque transmission—corresponding, say, to a completely opened mechanical coupling. Clutch slip values lying between these two extremes can also be achieved by appropriate actuation of the electric machine. The electric machine acting as a coupling can be used to dampen vibrations, namely: 1) with the torque transmitter at the takeoff end stationary, for dampening at the drive end, and 2) or else by adjusting a clutch slip varying with the rotational nonuniformity to isolate vibrations of the takeoff end from the drive end.

The electric machine can also serve for drive slip regulation (ASR). Regulation of the drive slip—in the state of the art—is accomplished in that, when a limit value of drive slip or a time change (time derivative) of the drive slip is attained, the driving moment is reduced. Reduction of the driving moment is implemented either by adjustment of the engine, i.e., by throttle valve adjustment or by ignition time adjustment, or by activating one or more wheel brake(s). A combination of both measures is also known. In particular, in addition to the engine adjustment, which occurs when a first limit value of the drive slip is exceeded, the wheel brakes can be activated when a second, higher limit value of drive slip is attained. Such regulating systems, on the one hand, are relatively sluggish, and on the other relatively hard to control, i.e., a particular time course of the drive torque.

According to an advantageous configuration, the electric machine serves to regulate drive slip and is designed such that it can produce a drive slip reduction by reducing the driving torque (of the drive assembly), in particular, by brake action and/or—when the electric machine is working as a coupling—by coupling slip action.

The drive slip regulation by electric machine can replace the known drive slip regulation by engine adjustment or wheel braking in the state of the art or be used in combination with the known drive slip regulation by engine adjustment and/or wheel braking in the state of the art. Advantageously, the control device responsible for controlling the electric machine essentially takes on the entire ASR control. On the other hand, an ASR control device can also advantageously be responsible for controlling the electric machine. If a separate ASR control device is provided, this advantageously communicates with the machine controls and possibly the engine and/or brake actuation.

The invention is also oriented to a method of operating a drive system, especially for a motor vehicle, wherein the drive system comprises a drive assembly, especially an internal combustion engine, and at least one electric machine for active reduction of rotational nonuniformities acting on the drive assembly, in particular, its drive shaft, or a shaft coupled or which can be coupled to it, wherein at least one sensor of the drive system and/or at least one quantity derived from sensor information is used both to control the drive assembly and also to control the electric machine, and/or a control unit responsible for controlling the electric machine or the drive assembly also controls the drive assembly or electric machine, respectively, in whole or in part.

The method can advantageously be carried out with a drive system according to one or more of the above-explained configurations. As regards individual features and advantages of the method, we refer to the above explanations on the system, which also pertain entirely to the method in its various configurations.

The subjects of claim 6 and the specification can also be advantageous in a drive system and a corresponding method, in which no use is made of a joint usage of a sensor, of sensor information, or of a control unit. Therefore, we reserve the right to orient patent claims to these subjects, omitting the complex of features in this regard presently contained in claims 1 and 5.

Furthermore, in all of the present specification, numerical indications "x" shall be understood in the sense of "at least x," and only preferably in the sense of "exactly x."

In the figures, parts essentially identical in function bear the same references.

Figure 1A:
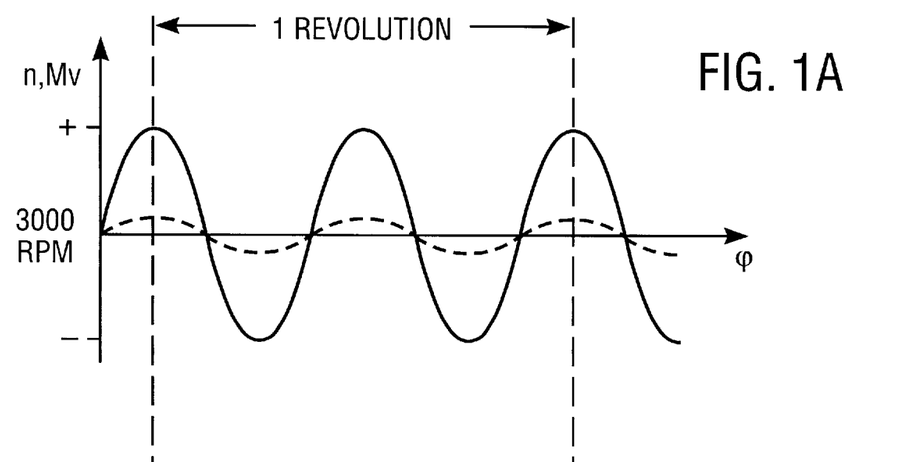
FIG. 1 a schematic sample representation of the functioning of the system for active reduction of rotational nonuniformities.

FIG. 1a shows (by solid line) the rotary speed n of a shaft as a function of the crankshaft angle__. The shaft periodically executes speed fluctuations toward smaller and larger speeds about a mean speed (here, 3000 revolutions per minute), which in this idealized example have a basically sinusoidal appearance. The shaft is, for example, the crankshaft of a four-cylinder, four-stroke internal combustion engine of a motor vehicle, having in the second order (i.e., at a frequency of 100 Hz) a relatively large rotational nonuniformity resulting from the gas and mass forces. As an illustration, the angle interval needed for one revolution of the shaft is also indicated. In general, rotational nonuniformities of higher orders and those of stochastic nature also occur on a shaft (not shown here). Thus, their appearance is generally not sinusoidal. There are fluctuations in the torque Mv of the engine about a mean torque, basically proportional to the rotational nonuniformities. The solid line in FIG. 1a also illustrates the curve of the engine torque Mv as a function of the crankshaft angle $\mu$.

Figure 1B:
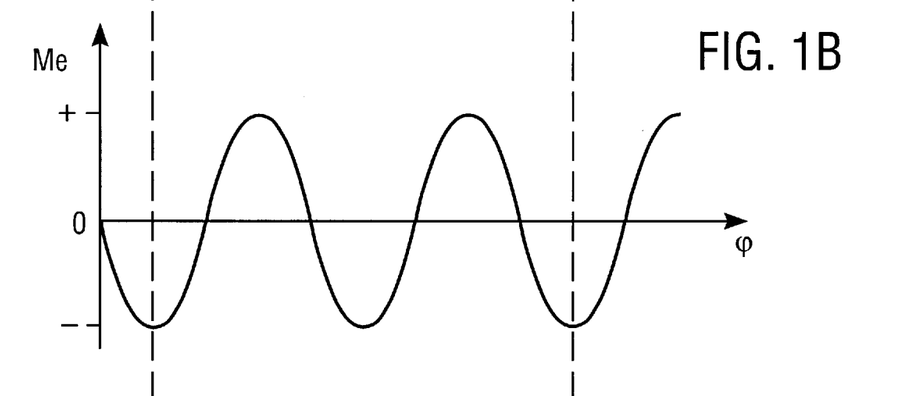

FIG. 1b shows the total torque Me as a function of the shaft angle $\mu$, which is applied by an electric machine coupled to the shaft. The curve of the machine torque Me largely corresponds to that of the rotational nonuniformity and the engine torque Mv, but is opposite in direction. That is, when there is a rotational nonuniformity toward higher speed (so-called positive nonuniformity), the electric machine generates a torque to brake the shaft (so-called negative torque), whereas in the case of a rotational non-uniformity toward lower speed (so-called negative nonuniformity) it generates a driving torque (so-called positive torque). The magnitude of the torque Me is chosen such that the rotational nonuniformity—and the fluctuation of the torque Mv proportional to it—is substantially reduced or even virtually disappears through its action, as is illustrated in FIG. 1a by the broken line.

In the mode of operation shown in FIG. 1b, the negative and positive torque extrema are equal in magnitude. Thus, the energy obtained during a braking phase is essentially equal to the energy used up in the following drive phase. Therefore, the outward energy flux is zero, and brake energy is only buffered temporarily inside the system. Thus, the system in this operating mode works like a pure rotational nonuniformity reducer with rapidly varying torque, without generating an additional torque.

Figure 1C:
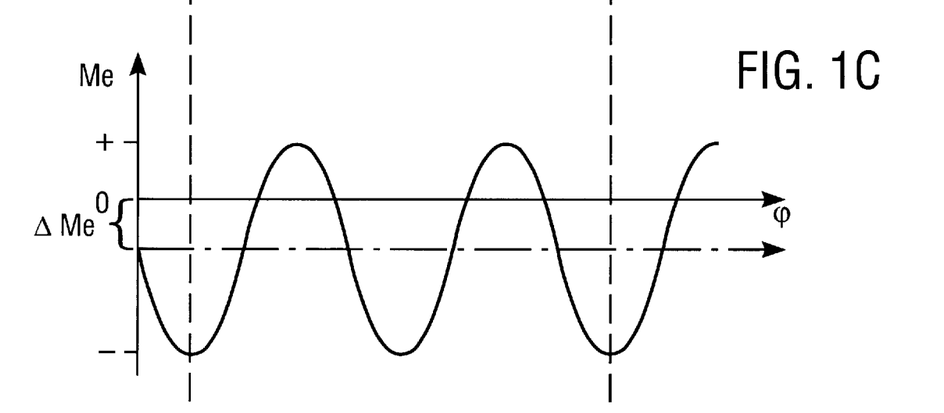

An example of an operating mode of the system modified from the preceding one, with an additional torque, is shown in FIG. 1c: The time course of the total torque Me corresponds to that of FIG. 1b, but it is shifted overall by a particular amount $\Delta$Me (the so-called deviation) in the negative direction. The deviation $\Delta$Me will generally vary slowly, but in the brief time frame represented here of approximately one period of rotation it is constant to a good approximation. The deviation $\Delta$Me here is smaller than the amplitude of the rapid variation of the torque, so that the overall torque Me alternately takes on positive and negative values. Averaged over the rapid torque variation, one obtains a constant torque $-\Delta$Me. Thus, on average, mechanical energy is withdrawn from the internal combustion engine, being largely transformed into electrical energy and taken out of the system. The electrical machine in this type of operation thus has the function of an electrical generator, besides the function of a rotational nonuniformity reducer, which can act as a brake and deliver current, e.g., to counterbalance operating losses of the system, to charge the vehicle's battery, and/or to operate electrical consumers.

If the deviation $\Delta$Me is greater than the amplitude for reducing the rotational nonuniformity, the electric machine will only work as a brake and no longer as a drive, and the braking action will vary in magnitude according to FIG. 1b and 1c, in opposite phase to the rotational nonuniformity.

Both small and very large generator powers can be adjusted simply by an appropriate adjustment of the (software) control system of the electric machine—without any structural (hardware) changes. Only the size of the electric machine is a limitation. Thus, the very same machine type can be used, for example, for small and large vehicle types without design adaptation.

The overall torque curve can also be shifted in the positive direction (positive deviation). The electric machine then works as a (driving) motor, besides its function as a rotational nonuniformity reducer, to support the engine when accelerating the vehicle, for example.

Figure 2:
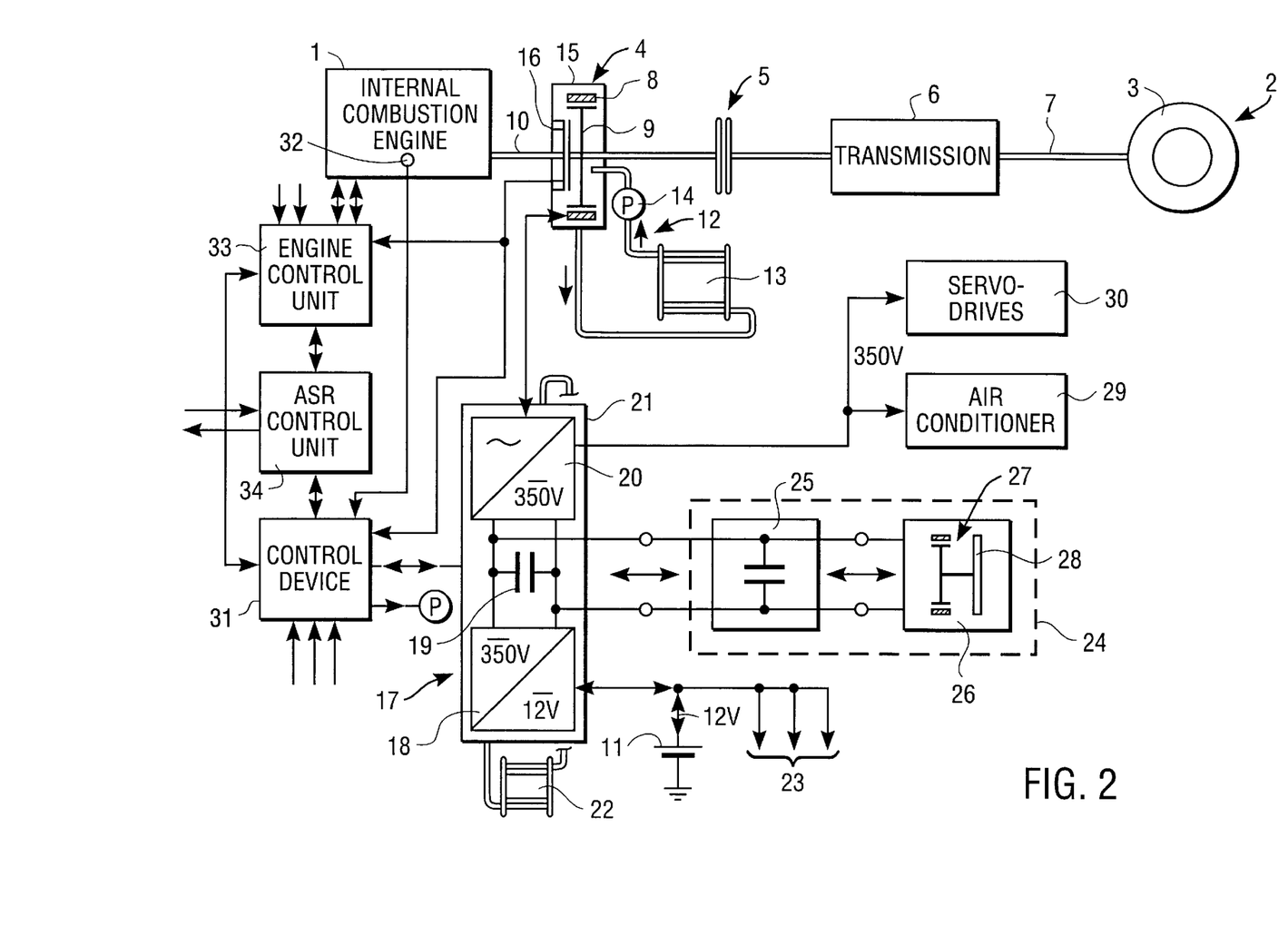
FIG. 2 a not-to-scale schematic representation of one embodiment of the system.

The drive system of a motor vehicle, such as a passenger car, represented in FIG. 2, has as its drive assembly an internal combustion engine 1, which can be a four-cylinder, four-stroke Otto or Diesel motor. The torque produced by the engine 1 can be transferred by a drive train 2 to drive wheels 3. In the takeoff direction, in the drive train 2, there first comes after the engine 1 an electric machine 4. This is followed by a travel coupling 5, a transmission 6, and an axle drive 7, which transfers the torque to the drive wheels 3. The coupling 5 and the transmission 6 can be a frictional clutch and a gearbox; alternatively, for example, an automatic coupling or transducer coupling are possible, each with gearbox or automatic transmission. In other embodiments (not shown), an additional coupling (activated by a control system) is arranged in the drive train 2 between engine 1 and electric machine 4, in order to prevent the engine 1 from following along when braking with the electric machine 4.

The electric machine 4—here, a rotary-current traveling-wave machine in induction or synchronous design—comprises a stator 8 and a rotor 9. The former is stationary and thrusts against the internal combustion engine 1, the vehicle chassis (not shown), or a coupling housing (not shown), whereas the latter sits directly on a drive shaft (crankshaft) 10 of the engine 1 or an extension thereof and is firmly coupled to it. The drive shaft 10 and the rotor 9 thus rotate together, without a gearing coming in between.

The electric machine 4 fulfills several functions: On the one hand, it functions as a rotational nonuniformity reducer, as has already been explained in connection with FIG. 1. On the other hand, it functions as a generator to charge the vehicle's battery 11 and to supply electrical consumers and thereby replaces a dynamo normally present in the motor vehicle. Furthermore, the generator function can serve to brake the vehicle or the engine 1. In addition, the electric machine 4 can function as an additional motor ("booster"), e.g., to support the engine when accelerating the vehicle. It also serves as a starter for the internal combustion engine and thus can also replace a separate starter normally provided in the motor vehicle. Finally, by virtue of the moment of inertia of the rotor 9, it functions as a flywheel and can thus replace the flywheel generally present on the crankshaft in traditional motor vehicles.

The electric machine 4 is cooled on the inside by a spray fluid cooling 12. After going through a cooler 13 and a pump 14, the cooling fluid—here, a suitable oil—is sprayed onto the rotor 9, and this in proximity to its axis of rotation. Because of the rotation of the rotor and centrifugal force, it travels outwardly, thereby cooling rotor 9 and stator 8, and then exits a housing 15 of the electric machine 4, again returning to the cooler 13 in a closed circuit. Depending on the loss power and rotary speed, the flow of coolant is provided by corresponding control of the pump 14, so that each time only just the required minimum of cooling fluid is present inside the housing 15. An equalization vessel (not shown) allows this variation of the quantity of cooling fluid in the housing 15. In other configurations (not shown), the electric machine (or only the rotor) is integrated in a coupling and/or transmission housing and cooled by a lubricating and/or cooling fluid (e.g., clutch or transmission oil) located therein.

Furthermore, the electric machine 4 is outfitted with a rotation transformer 16 (so-called resolver), which preferably has more than eight poles, here, for example, 12 poles. It consists of two adjacent circuit boards, one of which is stationary and the other turns with the drive shaft 10. The circuit boards have windings formed by conductor tracks on their facing surfaces, such that a transformer translation ratio dependent on angle of rotation results. The rotation transformer 16 operates on the transponder principle: The stationary windings (stationary board) are actively loaded with current/voltage and give off electromagnetic energy to the rotating windings (rotating board). The latter radiates a portion of this energy back again, and this portion depends on the angle of rotation, given the angle-dependent transmission ratio. The back-radiated portion generates in the stationary windings a signal dependent on angle of rotation. Evaluation of this signal provides the instantaneous angle of rotation of the drive shaft 10 with a precision of at least 0.5 degrees. In more simple configurations, an incremental pickup is used.

An invertor 17 provides the stator 8 of the electric machine 4, at a very high clock frequency (e.g., 100 kHz), with sine-evaluated pulse width modulated voltage pulses, which under the action of the machine's inductance basically yield sinusoidal three-phase currents, whose amplitude, frequency and phase are freely selectable.

The invertor 17 is a voltage intermediate-circuit pulse invertor and comprises three subassemblies: a dc voltage converter 18 (input assembly), which converts dc voltage from a low level (here, 12 V) to a higher intermediate circuit level (here, 60 V or 350 V) or back again, an electrical intermediate circuit accumulator 19, here, a capacitor or an arrangement of parallel-switched capacitors, and a machine invertor 21 (output assembly), which can generate from the intermediate circuit dc voltage the (synchronized) three-phase alternating voltage of variable amplitude, frequency and phase or—when the electric machine 4 is operating as a generator—can convert any such alternating voltages into the intermediate-circuit dc voltage. In other configurations (not shown), the intermediate circuit level lies at the upper edge of the low-voltage range that is permitted without special electrocution protection, here, 60 V.

The three subassemblies 18, 19, 20 of the invertor 17 are hermetically enclosed in a metal housing 21, which is filled with a suitable boiling type coolant. This is, for example, a fluorohydrocarbon, having a suitable boiling point, e.g., 60° C., at a suitable pressure (say, between 50 mbar and 3 bar). Evaporated coolant can condense in a condensation cooler 22 and return to the housing 21 in liquid form in a closed circuit. The housing 21 with the cooling circuit is hermetically tight.

The dc voltage converter 18 is connected, at the low-voltage side, with the vehicle's battery 11 and various low-voltage consumers 23, such as lighting and electronic devices. The invertor 17, on the one hand, can furnish current at low voltage level for charging the vehicle's battery 11 and supplying the low-voltage consumers 23, and on the other hand it can take current from the vehicle's battery 11 at low voltage level for starting the internal combustion engine 1.

The intermediate circuit accumulator 19 is connected to an external additional accumulator 24, which can be an electrical accumulator, here, an extra capacitance 25, and/or a flywheel accumulator 26. The additional accumulator 24 has the primary task of buffering the energy obtained from the rotational nonuniformity reducer in a brake phase and surrendering it again for the following drive phase. In addition, it can also serve to save that energy which accrues during other brake processes mediated by the electric machine 4. Finally, it can take strain off the vehicle's battery 11 when starting the engine 1, since it takes energy only slowly from the battery and saves it in the additional accumulator 24. Here, it is then available for fast removal during the starting process.

On the other hand, the (inner) intermediate circuit accumulator 19 has the basic task of providing voltage with the necessary steep rise time for clock purposes—i.e., quickly—to the machine-invertor group. It does not need any very high capacitance for this (e.g., it has 2 $\mu$F), and in fact low lead inductances are more advantageous for speed purposes, which is ensured by the arrangement in the interior of the invertor 17 (and preferably on the same board on which the electronic switches of the machine-invertor 20 are also arranged). The additional accumulator 24, on the other hand, can work relatively slowly, so that the lead capacitances here are not a problem, due to the external arrangement. In particular, the additional capacitance 25 can be 50–10,000 times greater than that of the intermediate circuit accumulator 19 (here, it is 4.7 mF, for example, for furnishing the rotational nonuniformity energy).

Even larger storage capacities can be achieved with the flywheel accumulator 26, which here comprises its own invertor-controlled electric machine 27 and a gyrating mass 28 coupled to it. The latter can be formed by a separate flywheel or be integrated in the rotor of the electric machine 27. The moment of inertia of the gyrating mass 28 is preferably 0.05 to 2 kgm². It is also possible to store a multiple of the energy needed to start the engine 1 in the flywheel accumulator 26 and quickly remove the particular energy needed for starting from it (i.e., in less than 1 second).

In other configurations (not shown), no separate additional accumulator 24 is provided. Here, the intermediate circuit accumulator 19 is dimensioned and possibly arranged outside the invertor 17 so that it can take on the function of the additional accumulator 24.

The intermediate circuit with its high voltage level (here, 60 V or 350 V) supplies various high-power consumers, such as an air conditioner 29 and servo-drives 30 with electrical energy. Whereas such high-power consumers are traditionally operated by mechanical coupling from the internal combustion engine 1, the high-voltage level available here allows a more efficient, purely electrical powering.

A control device 31, through appropriate actuation of its semiconductor switches, instructs the invertor 17 at each moment of time as to the amplitude, frequency, and phase that the alternating voltage generated by it should have. The control device 31, which can be formed, for example, by a correspondingly programmed microcomputer system, first determines the magnitude and the direction of the torque which the electric machine 4 is supposed to produce at a particular time. It can do this, e.g., by means of a characteristic diagram control system, in that it obtains, as input information from the rotation transformer 16, the angular position of the drive shaft 10, the mean rotary speed at the moment, and possibly other operating parameters, such as the throttle valve position, and it determines from a memorized characteristic diagram the rotational nonuniformity to be expected at the moment, as a function of these operating parameters. Another possibility is to determine the rotational nonuniformity actually existing at the time, for example, by computing the instantaneous rotational velocity on the basis of information furnished by the rotation transformer 16 and/or by evaluating the gas pressures existing in the engine 1 at the time, which can be detected by means of gas pressure sensors 32, and also by picking up the instantaneous torque of the engine 1 by means of a torque hub (not shown) in the drive train. A combination of automatic and open-loop control is also possible. From the value thus determined for the instantaneous rotational nonuniformity, a corresponding (opposite-phase) value is derived for the rapidly changing nominal torque of the electric machine 4, onto which may be additively superimposed a positive or negative additional torque of desired strength. To start the internal combustion engine 1, the nominal torque can be determined on the basis of memorized values, which specify the nominal time curve of the rotary speed or torque of the electric machine 4 during the starting process, perhaps supplemented by a measurement of these quantities and a feedback control, which ensures that the preset values are maintained.

In a second step, the control device 31 determines which amplitude, frequency, and phase of the voltage or current must be provided by the invertor 17 in order for the electric machine 4 to produce this nominal overall torque. This determination is done, in electrical induction machines, on the basis of a field-oriented automatic control, which is based on a model computation for the electric machine 4 and which uses as input information essentially the measurable electrical quantities of the stator (amplitude, frequency and phase of current and voltage) and the instantaneous mean speed of the rotor.

In FIG. 2, the control device 31 is shown as being arranged outside the invertor housing 21. In order to keep the lead inductances low and also participate in the boiling bath cooling, however, it is arranged inside the invertor housing 21 in other configurations (not shown).

The control device 31 shares various sensors serving to carry out its control tasks and sensor information derived from them with a motor control unit 33 to control the engine 1. Specifically, these are, for example, the rotation transformer 16 (angle position pickup), the gas pressure sensors 32, as well as sensors (not shown) for detecting the mean rotary speed, the loading condition of the engine 1 (e.g., through the throttle valve position) and its torque (e.g., through a torque hub).

Furthermore, the control device 31 communicates with a number of other control units: an energy consumption control unit (not shown) indicates how much energy is needed for charging the vehicle battery 11, for supplying the low-voltage consumers 23 and the high-power consumers 29, 30, so that the control device 31 can provide for a corresponding overall thrust adjustment·Me (see FIG. 1c). The motor control unit 33 tells the control device 31 whether the electric machine 4 is supposed to provide acceleration or braking of the vehicle in addition to its vibration diminishing function, so that it can provide a corresponding overall thrust shift·Me and perhaps temporarily switch off the rotational nonuniformity reduction function. Accordingly, an ASR (drive slip control) control unit 34 tells the control device 31, when drive slip is present, that the electric machine 4 should temporarily act as a generator brake, if necessary before the ASR control unit institutes a braking of the particular drive wheels by the wheel brakes as a more massive remedy if the drive slip continues. In addition, the ASR control unit can relay its slip information to the motor control unit 33, to bring about a further reduction in the engine torque. The motor control unit 33 can also implement an automatic start-stop control and tell the control device 31 whether the electric machine 4 should start the engine 1.

Energy obtained during each type of braking is kept in the additional accumulator 24, to be re-used for subsequent powering of the electric machine 4 or diverted to the vehicle battery 11.

Figure 3:
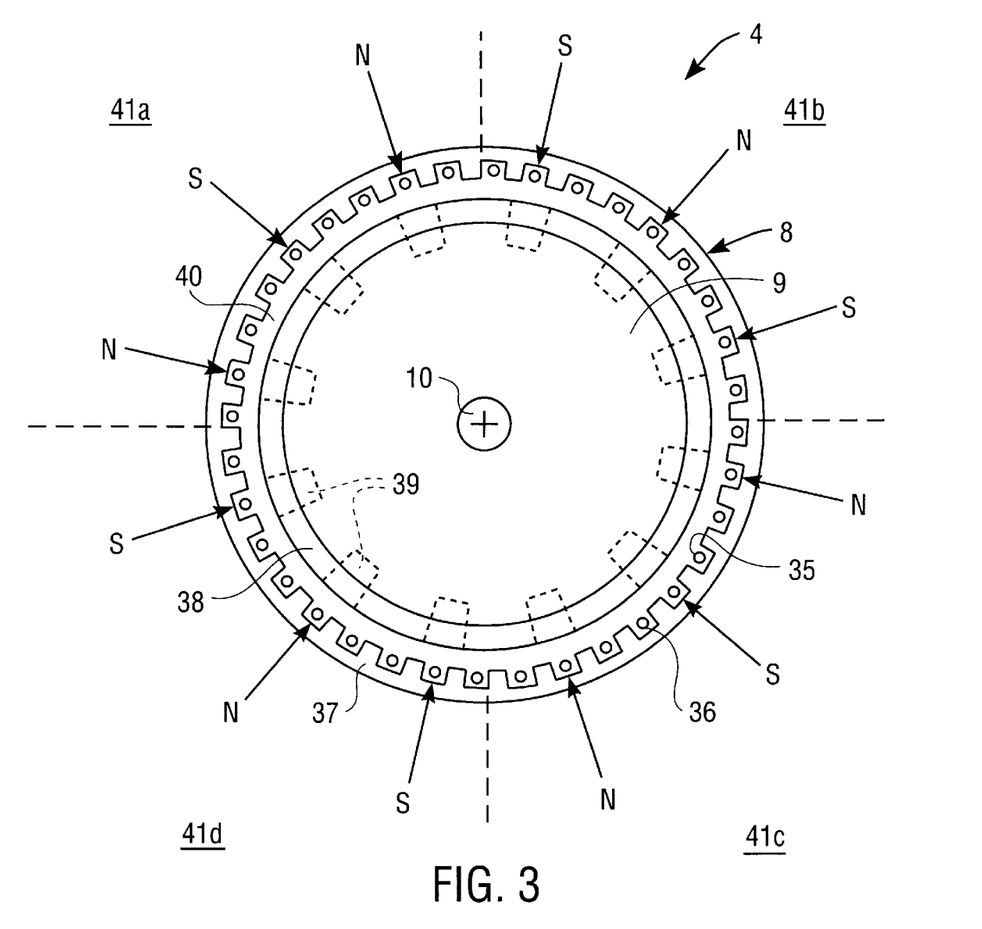
FIG. 3 a schematic cross sectional representation of an electric machine with plane of sectioning perpendicular to the axial direction in order to illustrate various machine types which can be used in the system.

The electric machine 4, shown more closely in FIG. 3, has no brushes or wiper and is thus free of wear. It has an outer diameter of around 250 mm and a length in axial direction of 55 mm and produces a continuous torque of around 50 Nm and a peak torque of around 150 Nm with a weight of 10–15 kg. It can attain rotary speeds corresponding to the peak speed of conventional internal combustion engines (around 6000 to 10,000 rpm) and is speed-resistant up to 14,000 rpm. The electric machine 4 has an exterior stator 8, having grooves 35 in the direction of the drive shaft 10 (axial direction). The stator 8 carries a three-phase winding 36, configured such as to form 12 poles when energized with three-phase current. There are three grooves 35 per pole, and thus a total of thirty-six grooves 35. (in other configurations (not shown), at least six grooves per pole, preferably nine grooves, are present in order to reduce stray effects.) The poles revolve in circular motion in the stator 8 with the rotary-current oscillation. Their momentary position at a particular time is shown by arrows carrying the designations "S" (for south pole) and "N" (for north pole). A back 37 closing off the grooves 35 on the outside is relatively thin in radial direction, its thickness being preferably 3–25 mm (at the location of a groove 35). The stator 8 is constructed from thin plates (the thickness here is 0.25 mm) of a material with low remagnetization losses (here, less than 1 W/kg at 50 Hz and one Tesla), with the planes of the plates being perpendicular to the axial direction.

The interior rotor 9 in the case of the induction machine is fashioned as a squirrel-cage rotor with cage bars traveling essentially in the axial direction, each of them being joined at the end face to a short-circuit ring 38. In the case of the synchronous machine, the rotor 9 carries a corresponding number of poles to the stator 8 (here, 12 poles), which can be formed by permanent magnets or appropriately excited coils. FIG. 3 also shows the synchronous machine, schematically indicating its rotor poles (reference number 39).

The air gap 40 between rotor 9 and stator 8 is relatively large; its width is 0.25 to 2.5 mm, preferably 0.5 to 1.5 mm.

In other configurations (not shown), the rotor is exterior and the stator is interior.

Figure 4:
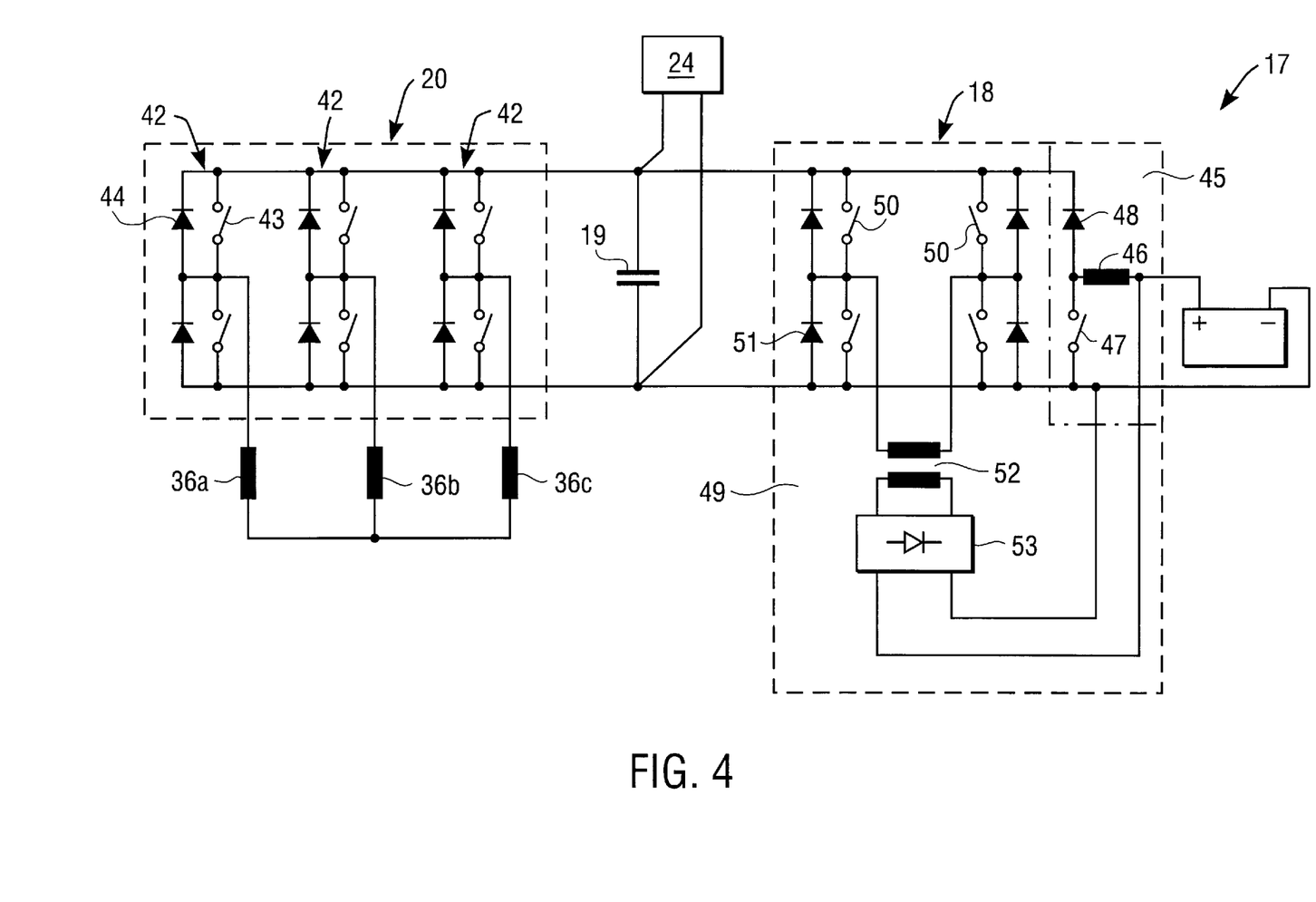
FIG. 4 a schematic circuit diagram of an invertor used in the system.

FIG. 4 shows a schematic diagram of the invertor 17. One recognizes the intermediate circuit accumulator 19 in the form of a capacitor, which is switched in parallel to the additional accumulator 24 (not shown more closely here). The capacitor symbolizes a parallel connection of several capacitors.

The machine invertor 20 is formed by three parallel-connected (but independently engaging) switch groups 42, each of the switch groups 42 being responsible for generating one of the three 3-phase voltages. Each of the switch groups 42 is a series connection of two (independently switching) switches 43 between the plus and the minus pole of the intermediate circuit. The series connection is joined at the center (i.e., between the switches 43) by one side to one of the three windings 36a, 36b, 36c of the three-phase winding 36; at the other side, the three windings 36a, 36b, 36c are joined together.

A free-wheeling diode 44 is connected in parallel to each of the switches 43. It is polarized such that it normally blocks and only when the opposite switch is open does it let through a brief current flow in the other direction, generated by self-inductance.

Each switch 43 symbolizes a parallel connection of several (e.g., five) MOS field-effect transistors, which are directly actuated by the control device 31 to form a three-phase The dc voltage converter 18 comprises two subassemblies, namely, one which can bring electrical energy from the low voltage level (12 V) up to the high intermediate-circuit voltage level (60 V or 350 V), and another which can bring electrical energy from the high voltage level (60 V or 350 V) to the low voltage level (12 V). The first-mentioned subassembly can be absent from configurations with vehicle battery arranged in the intermediate circuit.

The first subassembly is, for example, a step-up transformer 45. This is formed by a series circuit of an inductance 46, connected to the plus pole of the vehicle's battery 11, and a switch 47 connected to its minus pole and the minus pole of the intermediate circuit, this series circuit being connected in the middle to the plus pole of the intermediate circuit via a step-up diode 48 (polarized in the conducting direction). When the switch 47 is closed, a circular current flows from the plus to the minus pole of the vehicle battery 11. After opening the switch 47, a self-inductance voltage tries to prevent a collapse of this current, with the result that the high intermediate-circuit voltage level (60 V or 350 V) is temporarily exceeded and current flows through the (otherwise blocking) step-up diode 48 and charges the intermediate-circuit accumulator 19. By periodically opening and closing the switch 47, one achieves a quasistationary charging current, e.g., in preparation of the starting process. The switch 47 is a semiconductor switch, which is directly actuated by the control device 31.

The second subassembly is a step-down voltage transformer 49, for example, which functions similar to a switching power pack. It comprises two series circuits of switches 50 between the plus and minus pole of the intermediate circuit, each of them with parallel-connected free-wheeling diodes 51. The ends of a primary winding of a high-frequency (HF) transformer 52 are each connected to the middle of these series circuits. The secondary winding of the HF transformer 52 energizes a rectifying and smoothing unit 53, which in turn energizes the vehicle battery 11 and possibly low-voltage consumers 23. The switches 50 symbolize semiconductor switches, which are directly actuated by the control device 31. By periodically opening and closing the switches, a high-frequency alternating current can be generated, which induces in the secondary winding of the HF transformer 52 a corresponding alternating voltage at lower voltage level, which is rectified and smoothed out by the unit 53. The exact value of the resulting dc voltage can be precisely adjusted by means of the switch 50, through varying the switching frequency.

Figure 5:
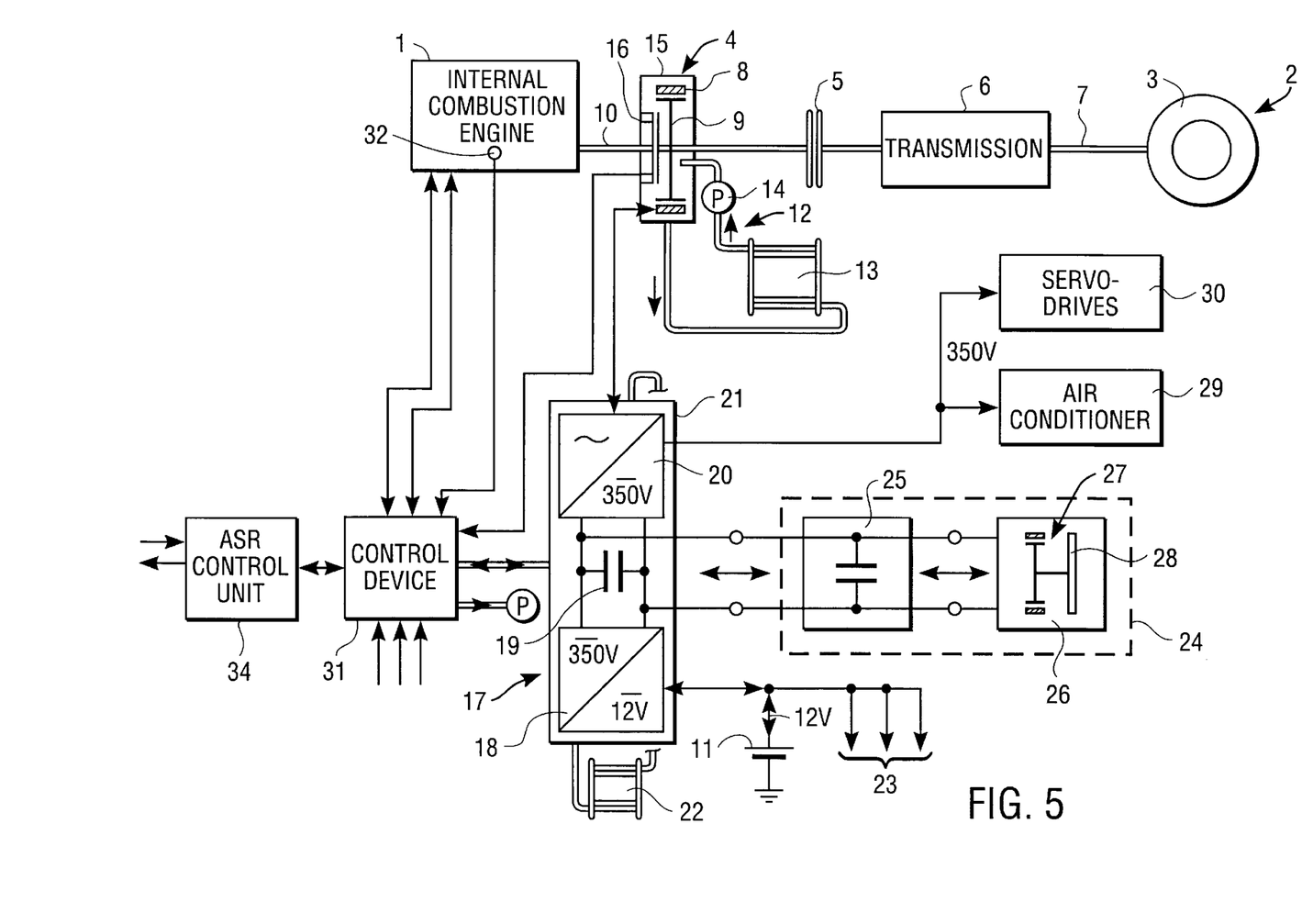
FIG. 5 a representation of another embodiment of the drive system corresponding to FIG. 2.

The drive system shown in FIG. 5 differs from the embodiments exemplified by means of FIG. 1–4 in that here—in addition to joint use of various sensors—the control of the engine 1 and the electric machine 4 also occurs through a joint control device.

Namely, the control unit 31 here takes on the control tasks of the engine control unit 33 of FIG. 2, which can therefore be eliminated here. The control unit 31 controls, on the one hand—as explained above—the invertor switches 43, 47, 50, such that the electric machine 4 produces the desired torque (alternating torque, possibly with overall superimposed torque for generator function, braking, generator-type braking, acceleration, and possibly torque for starter function), and carries out the start-stop control. On the other hand, it controls the engine like a motor management system, i.e., it controls the fuel supply, throttle valve position (especially when idling), fuel injection (time and quantity), ignition (time), valves (opening and closing times), cooling of the engine 1 (especially by controlling the coolant temperature), exhaust recycling (e.g., by controlling an exhaust recycling valve), and in this way the rotary speed (especially when idling), torque, power, fuel consumption, and exhaust gas composition of the engine 1.

The control of the engine 1 and the start-stop automation occurs in dependence on different variable quantities: on the one hand, in dependence on user-controlled quantities, such as gas pedal position (and, thus, throttle valve position), preselected driving velocity, selected transmission gear, brake and clutch activation and driving characteristics in the driving history (e.g., sporty driving characteristic); on the other hand, operating quantities, such as rotary speed, crankshaft angle, torque, gas pressure, knocking, drive slip, coolant temperature, exhaust gas composition, driving velocity. All these control tasks are taken over as well by the very high-performance control unit 31 for reduction of rotational nonuniformity.

In other configurations (not shown), a motor control unit (like 33 in FIG. 2)—derived from a traditional motor management system—takes over the control of the reduction of rotational nonuniformity. Here, the control unit 31 can be dispensed with.

Figure 6:
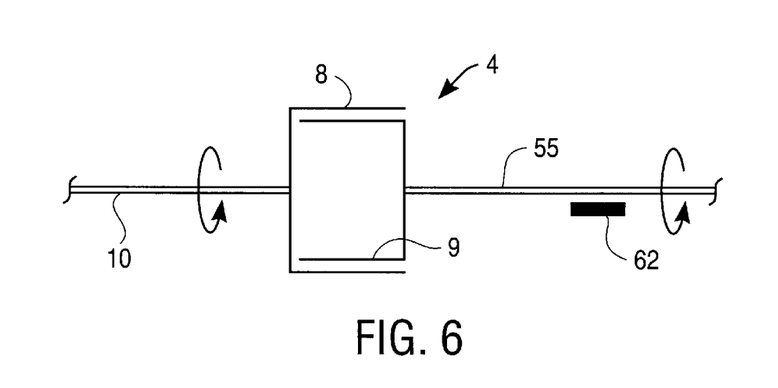
FIG. 6 a schematic representation of an electric machine with electromagnetic operating units that can rotate.

A single electric machine 4 per FIG. 6, which has the function of an electromagnetic coupling and/or synchronizing device for a following transmission, has an inner and an outer electromagnetic active element, which are termed here the rotor 9 and the stator 8', borrowing the conventional terminology from electrical machines. The rotor 9 is firmly joined to the takeoff shaft 55 and the stator 8' is firmly joined to the drive shaft 10 (in other configurations—not shown—this arrangement is reversed). The electric machine 4 can thus rotate as a whole in addition to the rotor's rotation; the term "stator" should thus be taken only in a transferred sense, seeing that it can rotate. Whereas in a stationary electrical machine—such as a rotary-field machine—it is possible to restrict the current supply to the stationary active element (i.e., the stator) and to produce currents in the rotating active element (i.e., the rotor) without supplying current, by induction alone, in the present case—where both active elements can rotate—current is supplied to at least one of them (here, the stator 8') across rotation-movable electrical connections (e.g., across wiper/slip ring contacts, not shown here). The takeoff shaft 55 can be prevented from turning with a mechanical clutch, here, a brake 62 which is thrust against the vehicle chassis or the transmission housing. The configuration shown has no bridge coupling, but other configurations (not shown) are outfitted with a frictional or nonpositive-locking bridge coupling for the mechanical connection of the shafts 10, 55. The machine 4 can be placed in or on the engine housing, transmission housing, or at any other place in the drive train 2.

The electric machine 4 can perform various functions. In the function as shift coupling and possibly as starting coupling, a synchronism of the shafts 10, 55 is achieved by such an adjustment of the torque-generating magnetic fields of the machine 4 that a uniform rotary speed prevails between the shafts 10, 55, i.e., the coupling slip between stator 8' and rotor 9 precisely vanishes. In an induction machine, this is accomplished, for example, by automatic control or open-loop control of the magnetic slip of a rotary field of suitable frequency and amplitude, turning opposite the direction of the drive torque. A positive-locking bridge coupling (not shown here) eliminates the electromagnetic losses during vanishing coupling slip.

An active transmission synchronization serves to accelerate or brake the drive shaft 55 during a gear change, such that the gears being meshed together have the same peripheral velocities. This function can be implemented in configurations of the single machine 4 even without coupling function. The shaft acceleration or braking is accomplished here by thrusting against the drive shaft 10 turning at the variable speed of the internal combustion engine 1. The contribution of this rotation is taken into account when determining and controlling the relative speed of the machine 4 necessary to the particular synchronization.

A reduction of rotational nonuniformities of the drive shaft 10 can occur with the vehicle at standstill, thrusting against the rotor 9 which is then prevented from turning by means of the brake 62. When moving under power, rotational nonuniformities of the takeoff shaft 55 can be reduced by rapid variation of the transmitted torque with the bridge coupling not engaged (or not present), specifically, by reducing [this torque] (i.e., increasing the clutch slip) for positive rotational nonuniformity and increasing [this torque] (i.e., decreasing the clutch slip) for negative nonuniformity.

Additional acceleration or braking is possible with the bridge clutch not engaged by generating appropriate torques—or in other words—less or more clutch slip. The electric machine 4 can be involved in an ASR control such that when the drive wheel slip is too large the clutch slip is momentarily increased and thus the moment applied to the drive wheels is reduced. A generator function to produce current is achieved by permanently maintaining clutch slip.

The electric machine 4 can start the internal combustion engine 1 directly, by thrusting against the takeoff shaft 55 fixed by the brake 62. In another configuration, when the machine 4 does not provide sufficient torque for this, it can serve as a nonwearing flywheel starter, making use of the electromagnetic coupling function. For this, the electric machine 4 first accelerates, with gear disengaged and brake 62 released, the then free-wheeling rotor 9, along with the takeoff shaft 55, propped against the drive shaft 10 and the compression of the still idle engine 1, up to a relatively high rotational speed, e.g., 2000 rpm. The electric machine 4 is then reversed in a brief time, such that it produces a braking moment, i.e., frictional connection between the rotor 9 and the stator 8'. In this way, the rotor 9 with the takeoff shaft 55 and the stator 8' with the drive shaft 10 are quickly brought to a common mean speed (e.g., 800 rpm) and the engine 1 is started.

What is claimed is:

1. A drive system, in particular for a motor vehicle, comprising a combustion engine (1);

an electrical machine (4) acting on the crankshaft (10) of the combustion engine (1) or a shaft coupled therewith, for active reduction of rotational fluctuations, such electrical machine (4) being controlled by an inverter (17) by sine-evaluated pulse modulation with a clock frequency of at least 10 kHz, and a microcomputer controller (31) which controls both the combustion engine (1) as well as the inverter (17) of the electrical machine (4) for actively reducing rotational fluctuations.

2. A drive system according to claim 1 wherein the microcomputer controller (31) only controls the electrical machine (4) and the combustion engine (1) in specific operating modes.

3. A drive system according to claim 1 wherein the microcomputer controller (31), during control of the combustion engine (1), assumes one or several of the following control functions: fuel supply control, throttle valve control, fuel injection control ignition control, valve control, cooling system control, exhaust cleaning control, knock control, loading pressure control, exhaust recycling control, cylinder shutdown, start and stop control and transmission control.

4. A drive system according to claim 1 wherein the electrical machine (4) has at least one additional function including the function of a starter and the function of a power supply generator.

5. A drive system according on claim 4 wherein the reduction of rotational fluctuations is achieved by at least one of control, regulation and a combination of control and regulation.

6. A drive system according to claim 1 wherein in order to reduce rotational fluctuations, the electrical machine (4) produces a rapidly alternating torque in the form of a decelerating torque in the case of positive rotational fluctuations and an accelerating torque in the case of negative rotational fluctuations, over which it superimposes a positive or negative torque, respectively, to additionally generate an accelerating or braking torque.

7. A system according to claim 6 wherein the energy gained upon reduction of a positive rotational fluctuation (braking energy due to rotational fluctuation) as well as any energy gained in the case of a negative additional torque (braking energy due to additional torque) is at least partially stored and the stored braking energy due to rotational fluctuation is at least partially reused in the reduction of a negative rotational fluctuation.

8. A drive system according to claim 1 wherein the electrical machine (4) can bring about at least one of the acceleration and braking the crankshaft or the shaft coupled therewith, in order to accomplish at least one of accelerating a vehicle decelerating a vehicle, and reducing the slip of a drive wheel by decelerating in the context of an anti clip control system.

9. A system according to claim 1 wherein the electrical machine (4) supplies power at a relatively high voltage level to at least one high-performance consumer.

10. A system according to claim 9, wherein the high-performance consumer is at least one of a climate control system (29), a power steering drive (30), a pump, and a heating system.

11. A drive system according to claim 1 wherein the electrical machine (4) has a high torque density in excess of 0.01 Nm/cm$^3$.

12. A drive system according to claim 1 wherein the electronic switches (43, 47, 50) of the inverter (17) are fluid-cooled.

13. A drive system, in particular for a motor vehicle, comprising:

a combustion engine (1);

an electrical machine (4) acting on the crankshaft (10) of the combustion engine (1) or a shaft coupled therewith, for active reduction of rotational fluctuations, such electrical machine (4) being controlled by an inverter (17) sine-evaluated pulse modulations with a clock frequency of at least 10 kHz, a crankshaft angle sensor (16) with an accuracy of at least 0.5 degrees, wherein the information supplied by the crankshaft angle sensor (16) is used to control both the combustion engine (1) as well as the electrical machine (4).

* * * * *